June 6, 1933.    W. VAN B. ROBERTS    1,912,726
AMPLIFYING CIRCUITS
Filed March 21, 1928    2 Sheets-Sheet 1

INVENTOR
WALTER VAN B. ROBERTS
BY
ATTORNEY

June 6, 1933.  W. VAN B. ROBERTS  1,912,726
AMPLIFYING CIRCUITS
Filed March 21, 1928   2 Sheets-Sheet 2
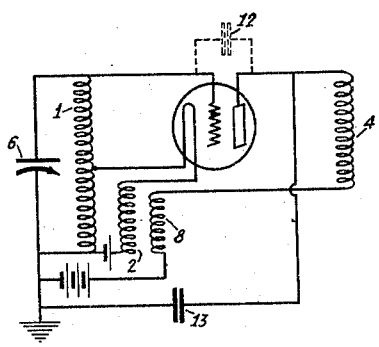
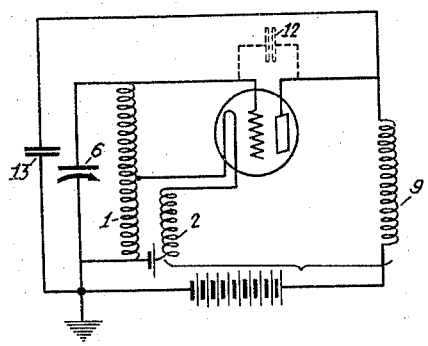
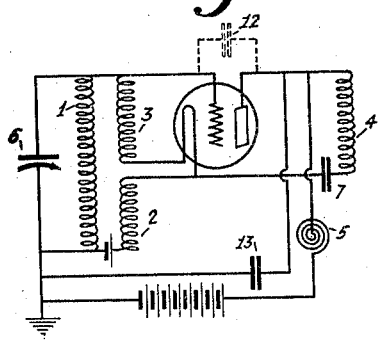
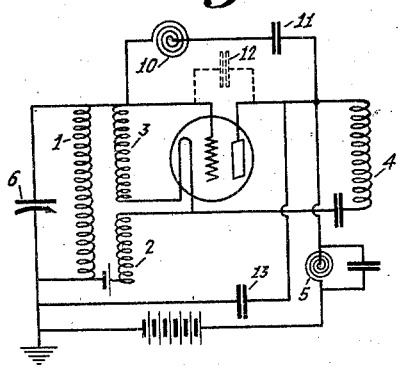
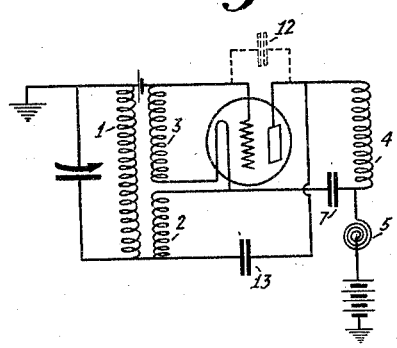
INVENTOR
WALTER VAN B. ROBERTS
BY
ATTORNEY Patented June 6, 1933

1,912,726

UNITED STATES PATENT OFFICE

WALTER VAN B. ROBERTS, OF PRINCETON, NEW JERSEY, ASSIGNOR TO RADIO CORPORATION OF AMERICA, A CORPORATION OF DELAWARE

AMPLIFYING CIRCUITS

Application filed March 21, 1928. Serial No. 263,242.

This invention relates to a circuit for amplifying electric currents of small intensity, such as those produced in an antenna by received radio signals. More particularly it relates to an amplifying circuit in which an electron discharge valve is used and in which a neutralizing system is provided for neutralizing the grid-plate capacity of the electron discharge valve.

Heretofore in designing neutralized amplifying circuits, it has been necessary to insulate both the rotor and the stator of the tuning condensers. This is due to the fact that when using common A and B current sources such as batteries for the detecting and amplifying circuit, one terminal of each source or battery is grounded. This places the filament at ground potential and as the filament potential is approximately half way between the potential of the stator and that of the rotor of the tuning condenser in a neutralized amplifying circuit, it is necessary to carefully insulate both the stator and the rotor. This has been found objectionable, especially when it is desired to use a gang condenser in which all of the rotors, including the rotor of the detecting circuit tuning condenser, are connected on a common metal shaft.

It is the object of my invention to provide a receiving circuit having a neutralizing system which will allow the amplifying and detector circuits to be tuned by means of a unicontrol gang condenser in which all of the rotors are located on a common metal shaft that is maintained at ground potential. It is a further object of my invention to provide a neutralized circuit as described, in which common A and B current sources such as batteries are used for the various stages. Other and further objects of my invention will be apparent upon reading the following specification in connection with the accompanying drawings in which various modifications of my invention are diagrammatically illustrated.

In the accompanying drawings Fig. 1 shows a receiving circuit employing one form of my neutralizing system.

Figs. 3 to 9 are modifications of Fig. 2 varying slightly in detail therefrom. These figures will in turn be described in detail.

Figure 1:
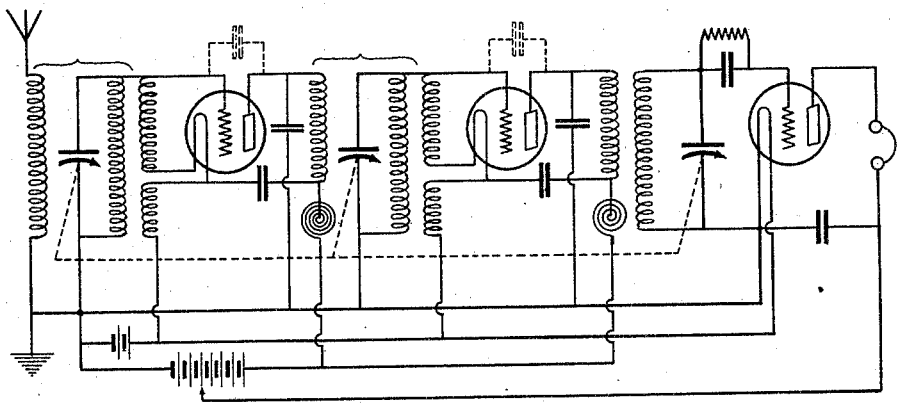

Referring more particularly to the drawings, Fig. 1 discloses a radio receiving circuit employing two stages of tuned radio frequency amplification and a detector circuit. The two stages of radio frequency amplification are provided with a neutralizing system according to my invention. The figure diagrammatically shows how the rotors of the tuning condensers may all be fastened to a single metal shaft which is maintained at ground potential. The figure also shows the arrangement whereby common A and B batteries are used. For the sake of clearness, reference characters have been omitted from this figure but one of the neutralized amplifying stages has been redrawn in its various modifications, each of which is hereinafter described in detail.

Figure 2:
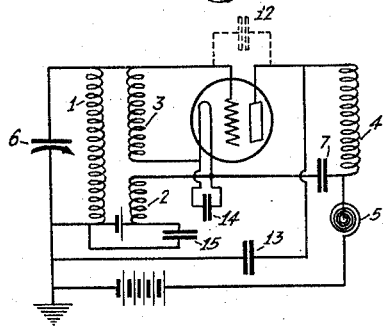
Fig. 2 is a detailed illustration of one of the neutralized amplifying stages of Fig. 1.

Fig. 2 illustrates one of the neutralized amplifying stages disclosed in Fig. 1. In this modification the rotor of the tuning condenser is maintained at ground potential and the filament at an intermediate potential by placing the input circuit tuning inductance in the filament heating circuit. The inductances indicated at 2 and 3 are connected in series with the tube filament and one on each side of the filament. The upper end of the inductance 3 is connected to the grid and the lower end to one terminal of the filament. The upper end of inductance 2 is connected to the other terminal of the filament and the lower end is connected to one terminal of the source of filament heating current. The inductance 1 which is connected in parallel with the tuning condenser, is connected at its upper end to the upper end of inductance 3 and is connected at its lower end to the other terminal of the source of filament heating current. The inductance 1 is thus connected in parallel with the series arrangement of inductances 2 and 3 with respect to the tuning condenser 6. The filament heating circuit is traced from the A battery thru the inductance 2, the filament, inductance 3 and inductance 1 back to the A battery.

The inductances 1, 2 and 3 may be mutually coupled in any desired manner or they may not be coupled, the only requirement being that the effective inductance of the combination should be of the proper magnitude to be tuned by the variable condenser 6 to the desired frequency. The output circuit contains the usual coupling coil 4. In this modification the plate potential is supplied to the lower end of the coupling coil 4 through a choke coil 5.

It should be noted that the choke coil 5 is in parallel with the inductance 2 from a radio frequency view point. If the inductance of the choke coil 5 is not great compared to the inductance of coil 2, the parallel connection acts to reduce the apparent inductance of the coil 2 and it is the resulting apparent inductance of coil 2 that must be dealt with.

Coils 2 and 3 are preferably unequal in inductance so that the radio frequency potential of the filament is less than half that of the grid. The proportioning is preferably made such that the voltage drop across coil 3 multiplied by the grid-filament capacity equals the voltage drop across coil 2 multiplied by the filament-ground capacity. This insures symmetry and this condition can also be obtained by adding capacity in parallel to the grid-filament or filament-ground capacity.

A condenser 7 is connected between the lower end of the coupling coil 4 and the filament. This condenser is required when the upper end of choke coil 5 has a different radio frequency potential from that of the filament. In some cases it is also advisable to connect large by-pass condensers, 14 and 15 across the filament terminals and across the A battery ends of coils 1 and 2.

The capacity between the grid and plate elements of the tube which is illustrated in dotted lines as the condenser 12, is neutralized by means of the neutralizing condenser 13 and the inductance 2 in the same manner as described in Rice Patent No. 1,334,118.

Figure 3:
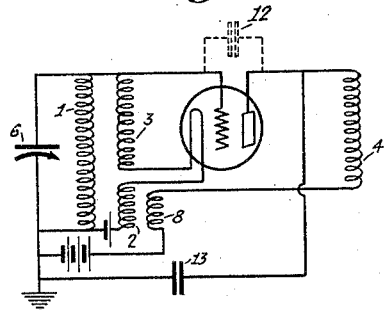

In the modification shown in Fig. 3 the choke coil 5 is replaced by a coil or inductive winding 8 which is coupled to coil 2. The mutual inductance between coil 8 and coils 1, 2 and 3, is so adjusted that the radio frequency potential of the upper end of coil 8 is the same as the radio frequency potential of the filament. The capacity connection between the lower end of the coupling coil 4 and the filament which is illustrated in Fig. 2 as the condenser 7, is thus avoided and the lower end of coupling coil 4 is connected solely and directly to coil 8.

Figure 4:
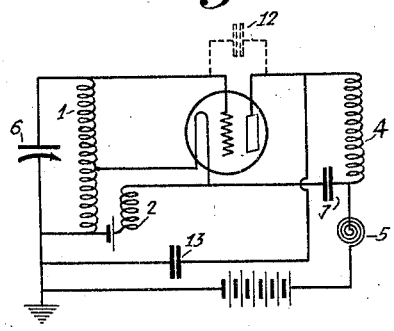

In Fig. 4, an alternative arrangement for the filament heating circuit is shown. In this modification the inductance 3 is removed and the return from the filament is connected to approximately the mid point of coil 1. The filament circuit thus consists of coil 2, the filament and the lower portion of coil 1. This arrangement has the advantage of offering less resistance to the heating current due to the shortened path. In this modification, as in the modification shown by Fig. 2, the size of the coils and the amount of coupling between coils 1 and 2 are made such, that the apparent inductance of the combination can be tuned by the condenser 6 to the desired frequency. The mutual inductance plate coil 8 described in Fig. 3 can also be substituted for the choke coil 5 shown in this modification. This results in the modification shown by Fig. 5.

In the modification shown by Fig. 6, the coupling coil 4 of Fig. 5 is combined with the mutual inductance coil 8. This combined coil indicated at 9 in Fig. 6, is coupled both to coil 2 and to the inductance, not shown, in the input circuit of the next stage. It is to be noted that while coil 9 is to be coupled to coils 1 and 2, the input coil of the next stage must not be coupled to coils 1 or 2. One way of arranging this, would be to place coils 1 and 2 at right angles to the input coil of the next circuit and to arrange coil 9 so that it will not be at right angles or any other angle of zero coupling, to the other coils. A convenient way to obtain this coupling would be to place coil 9 at an angle of 45° to coils 1 and 2 and 45° to the input coil in the next stage.

In Fig. 7 a modification is shown in which the plate is fed directly from the B battery through a choke coil 5. Otherwise the circuit is similar to the arrangement shown in Fig. 2.

In Fig. 8 the arrangement is similar to Fig. 7 with the addition of a second choke coil 10 connected in series with a capacity 11 between the grid and plate. The object of this choke coil 10 which has characteristics similar to that of choke coil 5, is to balance out any unbalance in the circuit which might be caused by changes in the reactance of choke coil 5 with frequency variations. This is objectionable only when the choke coil 5 is connected directly to the plate as shown in Figs. 7 and 8. The use of some means such as the choke coil 10 to balance any changes in the reactance of choke coil 5, is desirable because of the fact that choke coil 5 being in parallel with the high reactance of the neutralizing condenser, may upset the bridge balance to a considerable degree by undergoing reactance changes. The condenser 11 is provided to keep the plate potential off the grid.

If it should be desired to ground the grid side of the condenser, Fig. 2 may be rearranged to give the circuit shown by Fig. 9. In this circuit the A battery is inserted between the upper end of coil 1 and the upper end of coil 3, while the lower end of coil 1 is connected directly to the lower end of coil 2. The ground connection is made to the upper end of coil 1. Otherwise, the circuit is the same as that shown by Fig. 2.

It is to be understood that various other modifications and arrangements of my invention can be made and that I do not intend to be limited other than by the scope of the appended claims.

What is claimed:

1. An amplifying circuit comprising a valve, an anode, a cathode and a control element in said valve, a circuit for supplying current to heat said cathode and means for neutralizing the internal capacity of said valve, said means comprising a condenser connected to said anode and in series with part of the cathode heating circuit.

2. An amplifying circuit comprising a valve, an anode, a cathode and a control element in said valve, a tuning condenser, an inductance connected in parallel with said tuning condenser, one end of said inductance being connected to said control element, a second inductance connected between said control element and said cathode, a third inductance forming a path between said cathode and the other end of the first mentioned inductance, and an output circuit connected between said anode and said cathode.

3. An amplifying circuit comprising a valve, an anode, a cathode and a control element in said valve, an input circuit for said valve and an output circuit for said valve, said input circuit including a condenser, an inductance connected in parallel with said condenser, a second inductance connected between said cathode and said control element, said second inductance having a substantially negligible resistance, a path connecting one end of the first mentioned inductance to said control element and a second path connecting the other end of said first mentioned inductance to said cathode.

4. An amplifying circuit comprising a valve, an anode, a cathode and a control element in said valve, an input circuit for said valve and an output circuit for said valve, said input circuit including a condenser, an inductance connected in parallel with said condenser, a second inductance connected between said cathode and said control element, a path connecting one end of the first mentioned inductance to said control element and a second path containing a source of cathode heating current connecting the other end of said first mentioned inductance to said cathode.

5. An amplifying circuit comprising a valve, an anode, a cathode and a control element in said valve, an input circuit for said valve and an output circuit for said valve, said input circuit including a condenser, an inductance connected in parallel with said condenser, a second inductance connected between said cathode and said control element, a path connecting one end of the first mentioned inductance to said control element and a second path containing a means for neutralizing the capacity between said anode and said control element connecting the other end of said first mentioned inductance to said cathode.

6. An amplifying circuit comprising a valve, an anode, a cathode and a control element in said valve, an input circuit for said valve and an output circuit for said valve, said input circuit including a condenser, an inductance connected in parallel with said condenser, a second inductance and a third inductane connected in series with respect to each other and in parallel with respect to said condenser and the first mentioned inductance, a connection from said second inductance to said cathode and a connection from said third inductance to said control element.

7. An amplifying circuit comprising a thermionic valve, a cathode in said valve, an input circuit for said valve, an inductance shunted by a condenser for tuning said input circuit, means including a second inductance for neutralizing the internal capacity of said valve and a circuit for supplying current to heat said cathode, said circuit including said second inductance and at least a portion of the first mentioned inductance.

8. An amplifying circuit comprising a valve, including an anode, a cathode, and a control electrode, an input circuit for said valve, a condenser for varying the tuning of said input circuit, a connection from a point of constant potential to one terminal of said condenser, a connection from the other terminal of said condenser to said control electrode, and means for maintaining a potential difference between said point of constant potential and said cathode, which is a real, positive, constant with respect to frequency, proper fraction of the potential difference between said point of constant potential and said control electrode.

9. An amplifying circuit comprising a valve, a cathode in said valve, means for maintaining said cathode at a potential different from the ground potential, an input circuit for said valve, a condenser for varying the tuning of said input circuit, a ground connection to the rotor of said condenser, and means comprising a portion of said input circuit and a condenser connected between said output circuit and the ground connection for neutralizing the internal capacity of said valve.

10. An amplifying circuit comprising a valve, an anode, a cathode and a control element in said valve, means for maintaining said cathode at a radio frequency potential intermediate between the ground and the control element potential, an input circuit for said valve, a variable tuning condenser in said input circuit, a ground connection to the rotor of said condenser and a second condenser connected between the plate of said valve and the rotor of said condenser for neutralizing the internal capacity of said valve.

11. In combination, a thermionic amplifying valve including an anode, a cathode, and a control electrode, an input circuit for said valve, a condenser in said input circuit, a split inductance connected in parallel with said condenser, a connection from one end of said inductance to said control electrode, a connection from an intermediate point on said inductance to said cathode, a connection from the other end of said inductance to said anode, a source of power for heating said cathode, and a circuit for supplying heating current from said source of power to said cathode, said circuit including at least a part of said split inductance.

12. In combination, a thermionic amplifying valve including an anode, a cathode and a control element, a source of power for heating said cathode, an inductance connected between said source of power and said cathode, a second inductance connected between said cathode and said control element, and a return path from said control element to said source of power, said inductance, said second inductance and said return path forming the cathode heating circuit.

13. An amplifying circuit including a thermionic valve having anode, cathode and control elements, a source of anode potential having one terminal grounded, a source of current for heating said cathode having one terminal grounded, a tuning condenser for said amplifying circuit, a ground connection to one side of said tuning condenser, a condenser for neutralizing the internal capacity of said valve, a ground connection to one side of said neutralizing condenser, and means for maintaining each of said valve elements at a potential different from the ground potential.

14. An amplyfying circuit comprising a thermionic valve, containing an anode, a cathode, and a control element, an input to said valve, an output from said valve, a ground connection to said amplifying circuit, and means for maintaining said cathode at a radio frequency potential, which is a real, positive, constant with respect to frequency, proper fraction of the control element potential.

15. An amplifying circuit comprising a space discharge device, including an anode, a cathode, and a control electrode, a tuned circuit having one end connected to a point of fixed potential and the other end connected to said control electrode, a neutralizing condenser having one terminal connected to said anode and the other terminal connected to the point of fixed potential, and means for maintaining said cathode at a radio frequency potential, which is a real, positive, proper fraction, constant with respect to frequency, of the radio frequency potential of the grid.

16. An amplifying circuit comprising a space discharge device, having a cathode, a plate, and a grid, said cathode not being maintained at a fixed potential, and a condenser for neutralizing the grid-plate capacity connected between the plate and a point of fixed potential.

WALTER van B. ROBERTS.